(12) United States Patent
Douglas

(10) Patent No.: US 7,019,278 B2
(45) Date of Patent: *Mar. 28, 2006

(54) LASER RECEIVER USING MULTIPLE ARRAYS OF PHOTODETECTOR ELEMENTS

(75) Inventor: Frank B. Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 10/404,807

(22) Filed: Apr. 1, 2003

(65) Prior Publication Data

US 2003/0202172 A1 Oct. 30, 2003

Related U.S. Application Data

(63) Continuation-in-part of application No. 09/965,661, filed on Sep. 27, 2001, now Pat. No. 6,873,413.

(51) Int. Cl.
*H01J 40/14* (2006.01)
*G01C 3/08* (2006.01)

(52) U.S. Cl. ............... 250/214 R; 250/208.2; 327/514; 356/4.01

(58) Field of Classification Search ............ 250/214 R, 250/208.2, 551; 327/514; 33/286, DIG. 21; 356/4.01, 4.07, 139.03, 139.04, 141.2, 152.1, 356/615

See application file for complete search history.

(56) References Cited

U.S. PATENT DOCUMENTS

| 4,062,634 A | 12/1977 | Rando et al. |
| 4,240,208 A | 12/1980 | Pehrson |
| 4,676,634 A | 6/1987 | Petersen |
| 4,732,471 A | 3/1988 | Cain et al. |
| 4,907,874 A | 3/1990 | Ake |
| 4,976,538 A | 12/1990 | Ake |
| 5,747,861 A | 5/1998 | Dentai |
| 6,873,413 B1 * | 3/2005 | Douglas ............ 356/400 |

* cited by examiner

*Primary Examiner*—Stephone B. Allen
(74) *Attorney, Agent, or Firm*—Dinsmore & Shohl LLP

(57) ABSTRACT

A device and method for detecting the relative position of reference light includes a plurality of photodetector arrays arranged in a generally vertical row. Each array includes a plurality of photodetector elements arranged in a generally vertical array row. The photodetector elements in the arrays are arranged in a generally vertically oriented, extended row. Each of the photodetector elements provides an electrical output when illuminated with the light. A plurality of weighting circuits is provided, each weighting circuit being associated with a respective one of the plurality of photodetector arrays. Each weighting circuit provides a portion of the electrical output of the illuminated photodetector element in the array as a first reference signal related to the spacing of the illuminated photodetector element from a first end of the array row, and provides a portion of the electrical output of the illuminated photodetector element as a second reference signal related to the spacing of the illuminated photodetector element from the second end of the array row. The weighting circuit associated with each array row is connected to the weighting circuits associated with adjacent array rows. A plurality of output circuits are provided, with each output circuit associated with, and responsive to, the reference signals from connected weighting circuits. The output circuits determine the relative levels of the reference signals from the weighting circuits such that the position of the reference plane of light may be determined with respect to the detector device.

14 Claims, 3 Drawing Sheets

LASER RECEIVER USING MULTIPLE ARRAYS OF PHOTODETECTOR ELEMENTS

CROSS-REFERENCE TO RELATED APPLICATIONS

This application is a continuation-in-part of U.S. application Ser. No. 09/965,661, filed Sep. 27, 2001 U.S. Pat. No. 6,873,413.

STATEMENT REGARDING FEDERALLY SPONSORED RESEARCH OR DEVELOPMENT

Not Applicable.

BACKGROUND OF THE INVENTION

The present invention relates to equipment of the type used in surveying and construction and, more particularly, to a detector device for such applications which has an improved photodetector arrangement for detecting the position of reference light. The light may typically be a rotating laser beam that defines a reference plane of light or a stationary reference plane or cone of laser light. The reference plane may be horizontal or inclined, as dictated by the application.

Laser systems have commonly been employed in surveying and construction in which a laser beam is rotated in either a horizontal or a graded plane. U.S. Pat. No. 4,062,634, issued Dec. 13, 1977, to Rando, illustrates a laser transmitter which provides such a rotating reference beam. The rotating beam defines a plane, and various measurements can be made using the plane as a reference. For example, the elevation of a point remote from the laser transmitter may be measured using a rod on which a laser receiver is mounted. The bottom of the rod rests on the ground at the point where the measurement is to be made, and the operator moves the receiver along the rod to a position where it intercepts the laser beam, as indicated by a display on the receiver. One such laser receiver is shown in U.S. Pat. No. 4,240,208, issued Jun. 30, 1987, to Pehrson.

A similar surveying system is shown in U.S. Pat. No. 4,732,471, issued Mar. 22, 1988, to Cain et al. In the Cain et al. system, a laser transmitter produces an alignment field by projecting laser energy in a non-planar, stationary reference cone. The Cain et al. patent discloses a small, hand-held laser receiver which includes a display and a photodetector module. The receiver may be moved about a worksite to detect the height of the reference cone at various locations.

A number of laser detector or receiver devices have included circuitry that provides an indication of the position of the detected reference light with respect to the device as a ratio between several output signals. U.S. Pat. No. 4,907,874, issued Mar. 13, 1990, to Ake discloses such a detection and display device that includes first and second interdigitated photodetector elements. The photodetector elements are each made up of a plurality of sections which are arranged in a generally vertically oriented row. The heights of the sections of one of the elements increase from the bottom of the row to the top of the row, while the heights of the sections of the other element decrease from the bottom of the row to the top of the row. An enhanced detection and display device is shown in U.S. Pat. No. 4,976,538, issued Dec. 11, 1990, to Ake. The device has first and second interdigitated photoconductor elements that are each made up of a plurality of sections arranged in a generally vertically oriented row. In the same manner as shown in the '874 patent, the heights of the sections of one of the elements increase from the bottom of the row to the top of the row while the heights of the sections of the other element increase from the top of the row to the bottom of the row. Unlike the sections of the device of '874 patent, however, the sections of the elements in the device of the '538 patent are inclined with respect to the row. As a consequence, a beam sweeps across the sections in a manner providing a continuously variable output ratio.

While these detection devices provide accurate detection of laser light in a reference plane, they require the use of specially constructed photodetector elements having specific design geometries. Such photodetector elements are expensive, and add significantly to the overall cost of the detection devices. These devices do have the advantage, however, of reducing the amount and complexity of the necessary signal processing circuitry, since the position of the detected light is supplied to the circuitry as simply the ratio of a pair of detection signals. General purpose, photodetector elements in the form of PIN photodiode arrays, on the other hand are available at a fraction of the cost. Each PIN photodiode provides a separate output signal and if hundreds or thousands of PIN photodiodes are used with the outputs being processed in parallel, the large amount of processing circuitry required adds unacceptably to the overall cost of the detection device. It is desired to incorporate such low cost photodetector elements into a detection device, while also providing a reduced number of signals with a continuously varying relationship that indicate collective light position. One such an arrangement is disclosed and claimed in copending U.S. application Ser. No. 09/965,661, filed Sep. 27, 2001, and assigned to the assignee of the present invention. In the copending application, the disclosure of which is incorporated herein by reference, a plurality of photodetectors, such as PIN photodiodes, are arranged in a generally vertically oriented row. A weighting circuit is connected to each photodetector so that a portion of the output from an illuminated photodetector is provided as a first reference signal related in amplitude to the spacing of the illuminated photodetector from a first end of the row, and a portion of the output from the illuminated photodetector is provided as a second reference signal related in amplitude to the spacing of the illuminated photodetector from a second end of the row.

While this arrangement operates well, it is limited to relatively short photodetector arrays, since only a limited number of photodetectors can be connected to a tapped transformer weighting circuit to produce reference signals that define the illuminated photodetector position with sufficient accuracy. It is seen, therefore, that there is a need for a device and method for utilizing a plurality of photodetector arrays including a large number of photodetectors, and for accurately defining which one or ones of the photodetectors have been illuminated by processing a limited number of output signals that have a continuously varying relationship.

SUMMARY OF THE INVENTION

This need is met by a device and method according to the present invention for detecting the relative position of reference light that includes a plurality of photodetector arrays and a plurality of weighting circuits. The plurality of photodetector arrays are arranged in a generally vertical row. Each array includes a plurality of photodetector elements arranged in a generally vertical array row, such that the photodetector elements in the arrays are positioned in a generally vertically oriented, extended row. Each of the photodetector elements provides an electrical output when illuminated with the reference light. Each weighting circuit is associated with a respective one of the plurality of photodetector arrays, providing a portion of the electrical output of each photodetector element in the array as a first reference signal related to the spacing of the photodetector element from a first end of said array row, and providing a portion of the electrical output of the photodetector element as a second reference signal related to the spacing of the photodetector element from the second end of the array row. The weighting circuit associated with each array row is connected to the weighting circuits associated with adjacent array rows. A plurality of output circuits are provided, with each output circuit associated with and responsive to the reference signals from connected weighting circuits. The output circuits act to determine the relative levels of the reference signals from the weighting circuits such that the position of the reference plane of light with respect to the detector device may be determined.

The photodetector elements comprise PIN diodes. Each of the weighting circuits may include a tapped transformer circuit with each of the plurality of photodetector elements in an array being connected to the tapped transformer circuit of the associated weighting circuit. The weighting circuit may further comprise one or more resistors connecting the photodetector elements to the transformer. The photodetector elements are evenly spaced along and positioned adjacent each other in a generally vertically oriented, extended row. The device may further include a display, responsive to the output circuit, for providing an indication of the position of the reference light with respect to the detector device.

The method according to the present invention may include the steps of positioning a plurality of photodetector arrays arranged in a generally vertical row, each array including a plurality of photodetector elements arranged in a generally vertical array row, such that the photodetector elements in the arrays are arranged in a generally vertically oriented, extended row, each of the photodetector elements providing an electrical output when illuminated with the plane of light; for each photodetector array, providing a portion of the electrical output of each photodetector element in the array as a first reference signal related to the spacing of the photodetector element from a first end of the array row, and providing a portion of the electrical output of each photodetector element in the array as a second reference signal related to the spacing of the photodetector element from the second end of the array row; and determining the position of the reference plane of light with respect to the extended row based on the levels of the first and second reference signals from each of the arrays.

The method may further comprise the step of displaying an indication of the position of the reference plane of light with respect to the row. The step of positioning a plurality of photodetector arrays may include the step of positioning a plurality of PIN diodes in a plurality of arrays. The step of, for each photodetector array, providing a portion of the electrical output of each photodetector element in the array as a first reference signal related to the spacing of the photodetector element from a first end of the array row, and providing a portion of the electrical output of each photodetector element in the array as a second reference signal related to the spacing of the photodetector element from the second end of the array row may include the step of separating the portions of the electrical outputs using a tapped transformer, with each of the plurality of photodetector elements being connected to the transformer. A plurality of tapped transformers may be provided, with each of the plurality of transformers being connected to an associated photodetector array, and with the transformers connected in series in the same order as the arrangement of the arrays with which they are associated in the extended row.

The step of separating the portions of the electrical outputs using a tapped transformer with each of the plurality of photodetector elements being connected to the transformer may further include the step of, for each photodetector array, connecting the photodetector elements to the transformer using one or more resistors, and electrically connecting the tapped transformer. The step of positioning a plurality of photodetector arrays in a generally vertically oriented row may comprise the step of evenly spacing the plurality of photodetector arrays along the generally vertically oriented row, and evenly spacing the plurality of photodetector elements within each array. The step of receiving the first reference signals and the second reference signals from the ends of the plurality of tapped transformers.

Accordingly, it is an object of the present invention to provide a device and method for detecting the relative position of reference light; to provide such a device and method in which a plurality of photodetector arrays are positioned such that the photodetector elements in all of the arrays are arranged in an extended row; and to provide such a device and method in which a plurality of weighting circuits are responsive to the arrays and a plurality of output circuits are responsive to the weighting circuits for determining the position of the reference light.

Other objects and advantages of the invention will be apparent from the following description, the accompanying drawings and the appended claims.

DETAILED DESCRIPTION OF THE PREFERRED EMBODIMENT

Figure 1:
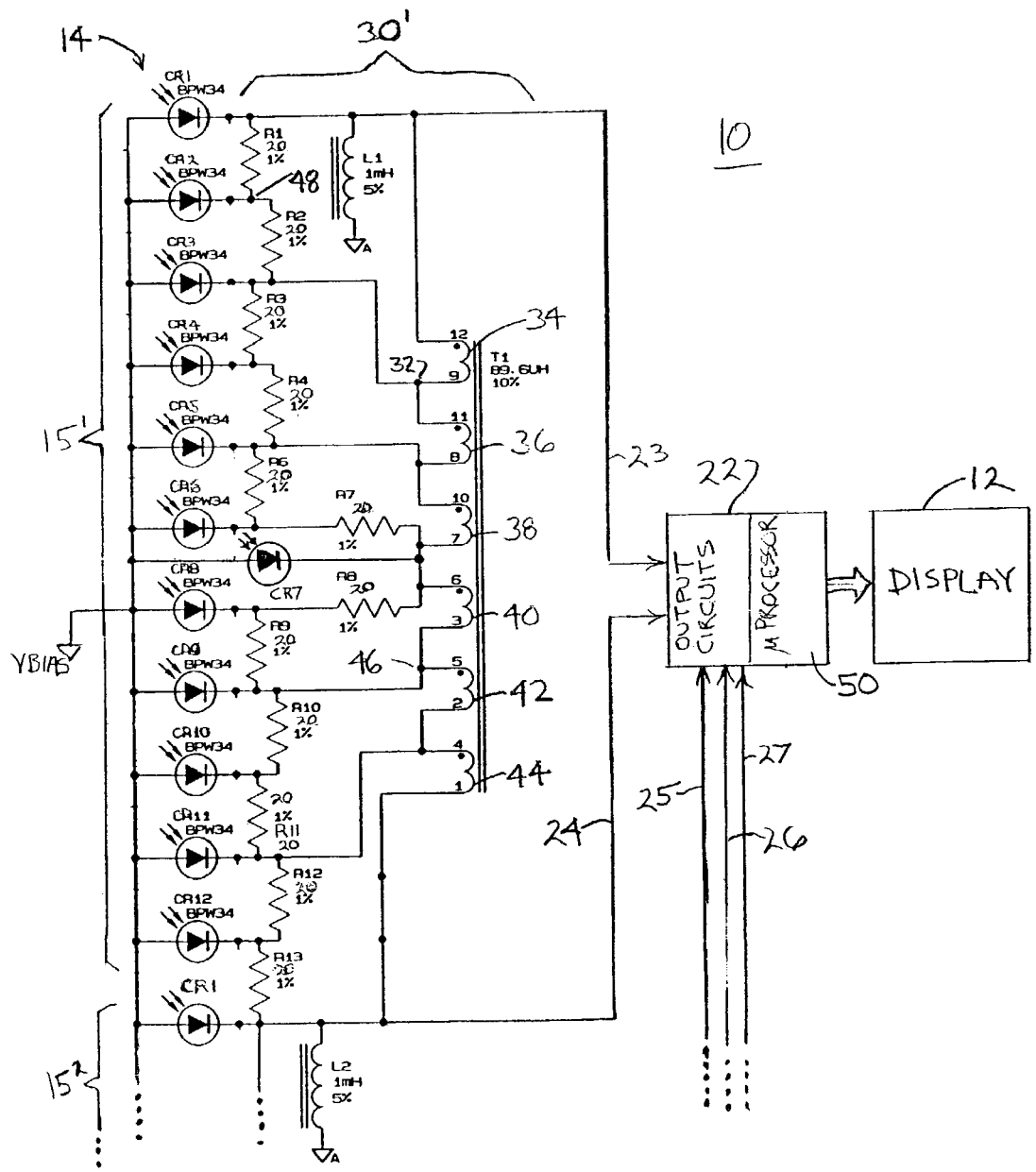
FIG. 1 is a schematic diagram of a portion of the circuitry which forms the device of the present invention.

Reference is made to FIG. 1, which generally illustrates a portion of a detection device 10 according to the present invention. The device detects reference light, such as laser light, and provides an indication of the location of the reference light with respect to the device. It is to be understood that the device 10 may be used with transmitters that provide either a stationary plane or field of light, or a rotating beam of light that is swept through a plane. The light may be projected in a true plane, or in a conical shape, or in another configuration to define a reference. Reference light may, for example, be produced by laser transmitters as shown in U.S. Pat. No. 4,062,634, issued Dec. 13, 1977, to Rando et al, or in U.S. Pat. No. 4,732,471, issued Mar. 22, 1988, to Cain et al. Other light transmitters may be used, as well.

Figure 2:
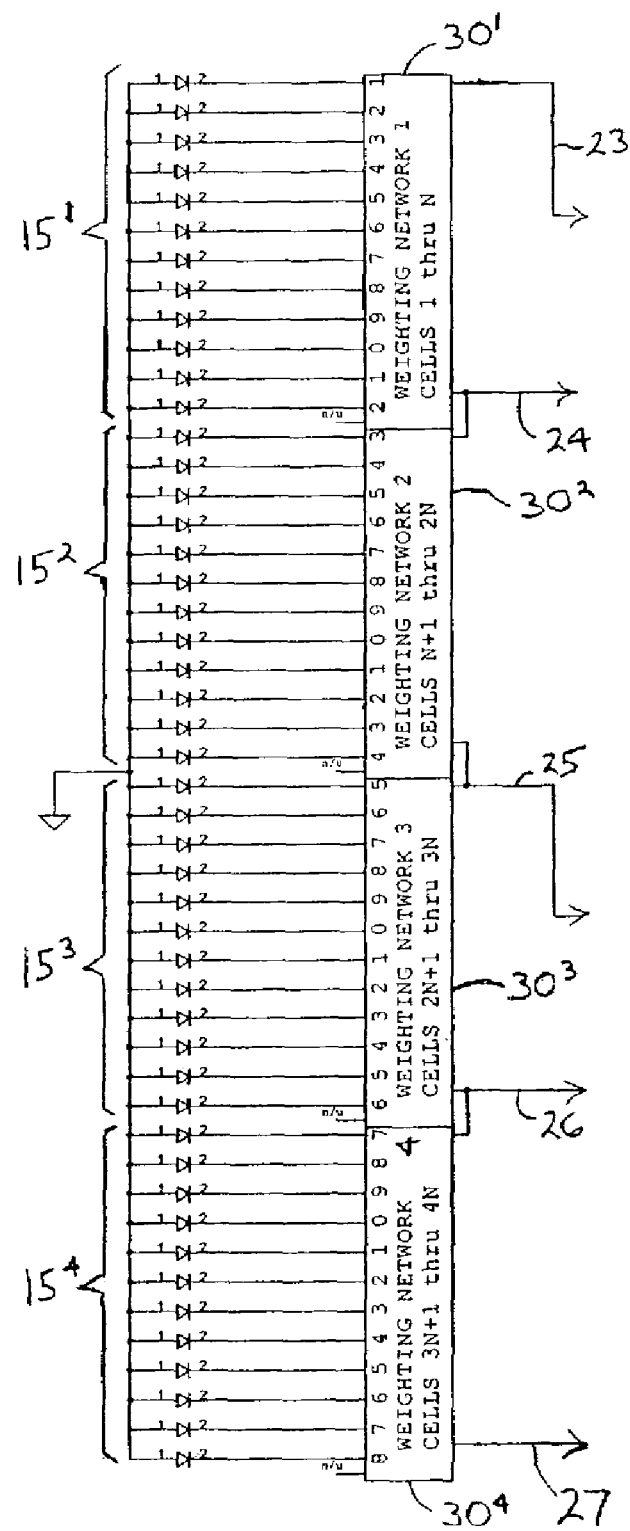
FIG. 2 is a schematic diagram of a portion of the photodetector arrays and weighting circuits of the device of FIG. 1, showing four arrays of photodetectors connected to four concatenated weighting circuits.

The detector device 10 includes a display 12, and a photodetector arrangement 14 including a plurality of photodetector arrays $15^1$, $15^2$, $15^3$, and $15^4$, shown in FIG. 2, arranged in a generally vertical row. Although for purposes of FIGS. 1 and 2 four photodetector arrays are shown, a greater or lesser number may be positioned in an extended row to permit light detection over a larger or lesser dimensional range. Each array includes a plurality of photodetector elements, CR1 through CR12, arranged in a generally vertical array row. The photodetector elements in these arrays $15^1$, $15^2$, $15^3$, and $15^4$, are collectively arranged in a generally vertically oriented, extended row. It will be appreciated that the terms "vertical" and "horizontal" are used here in only a relative sense, and are not intended to refer to any particular absolute orientation. The detector device may be operated with its extended row of photodetector elements in any orientation; it is preferable, however, that the row of photodetector elements be generally perpendicular to the reference plane of laser light which is to be detected. Each of the photodetector elements CR1–CR12 comprises a PIN diode that provides an electrical output when illuminated with the reference light. When the photodetector arrangement 14 is illuminated, output circuits 22 provide an indication on display 12 of the position of the reference plane of light with respect to the detector device 10. As an example, the display 12 may indicate whether the light is above, below, or within a reference band. Alternatively, the display 12 may provide more precise information regarding the position of the reference light, such as a numerical indication of position, or a multi-level display. Other display arrangements may be used or, alternatively, the device may be provided with no display, and with the output from the output circuits 22 being utilized by a machine control circuit to control machine position automatically.

The output circuits 22 are responsive to the relative levels of the first and second reference signals on lines 23 and 24, respectively, provided by the photodetector arrangement 14 for determining the position of the reference light. The output circuits 22 are also responsive to levels of reference signals on lines 25 and 26 from photodetectors in the other arrays.

The device further includes four weighting circuits $30^1$, $30^2$, $30^3$, and $30^4$, shown in FIG. 2. As discussed more fully below, weighting circuits $30^1$, $30^2$, $30^3$, and $30^4$ are associated with photodetector arrays $15^1$, $15^2$, $15^3$, and $15^4$, respectively. It will be appreciated that fewer photodetector arrays may be utilized if desired. The weighting circuit $30^1$ includes resistors R1–R4 and R6–R13, inductors L1 and L2 (shunting D.C. sunlight current), and tapped transformer T1. Each of the plurality of photodetector elements CR1–CR12 is connected to the transformer T1, either directly or through one or more of the resistors. The weighting circuit $30^1$ provides a portion of the electrical output of each photodetector element, when illuminated, as a component of a first reference signal on line 23, related to the spacing of the illuminated photodetector element from the upper end of the row of photodetectors in the array $15^1$. The weighting circuit $30^1$ also provides a portion of the electrical output of each photodetector element, when illuminated, as a component of a second reference signal on line 24, related to the spacing of the illuminated photodetector element from the lower end of the row of photodetectors in array $15^1$. The weighting circuit $30^1$ is configured such that the first reference signal on line 23 increases as the light moves toward the upper end of the row of PIN diodes, and the second reference signal on line 24 increases as the light moves toward the lower end of the row. Conversely, the first reference signal on line 23 decreases as the light moves toward the lower end of the row of PIN diodes CR1–CR12 in array $15^1$, and the second reference signal on line 24 decreases as the light moves toward the upper end of the row. When the light is in the middle of the row, the levels of the two reference signals on lines 23 and 24 are equal. The output circuits 22 respond to the levels of the first and second reference signals on lines 23 and 24 to determine the position of the reference light. As discussed below, the output circuits 22 respond to the reference signals on lines 25 and 26 to determine the position of the reference light when photodetectors in other arrays are illuminated.

Each of the weighting circuits $30^1$, $30^2$, $30^3$, and $30^4$ is associated with a respective one of the plurality of photodetector arrays $15^1$, $15^2$, $15^3$, and $15^4$ and provides a portion of the electrical output of each illuminated photodetector element in its associated array as a first reference signal related to the spacing of the illuminated photodetector element from a first end of the array row, and provides a portion of the electrical output of each illuminated photodetector element in its associated array as a second reference signal related to the spacing of the illuminated photodetector element from the second end of the array row. The weighting circuit associated with each array row is connected to the weighting circuits associated with adjacent array rows.

The weighting circuit $30^1$ provides reference current level signals on lines 23 and 24 in the following manner. Assume that only PIN diode CR3 is illuminated. The output current from diode CR3 will be supplied to node 32 of transformer T1. Approximately ⅚ of the current will pass through coil 34 to line 23, while ⅙ of the current will pass through coils 36, 38, 40, 42, and 44 to line 24. In similar fashion, assume that the reference light has moved such that only PIN diode CR9 is illuminated. The output current from PIN diode CR9 will be supplied to node 46 of transformer T1. Approximately ⅘ of the current from diode CR9 will pass through coils 42 and 44 to line 24, while ⅖ of the current will pass through coils 34, 36, 38, and 40 to line 23. Thus the way in which the diode current is split and supplied to lines 23 and 24 gives an indication of which of the diodes are illuminated and, therefore, the position of the reference light.

It will be noted that a number of the photodetector elements are not connected directly to a tap of the transformer T1. For example, diode CR2 has its output supplied to node 48. The current at node 48 is then split, with half passing through resistor R1 to line 23, and the other half passing through resistor R2 to node 32. At node 32, ⅚ of this half of the current passes through coil 34 to line 23, and the remaining ⅙ of this half of the passes through coils 36, 38, 40, 42, and 44 to line 24. This results in approximately 11/12 of the current being supplied to line 23.

It will be appreciated that the reference light may commonly illuminate more than one of the PIN diodes CR1–CR12 of array $15^1$ at a time. This may occur because the size of the reference beam of laser light is significantly greater than the size of the photodetector elements. Further, thermal gradients in the air through which the laser light passes may result in rapid positional fluctuation of the beam, effectively illuminating a number of photodetector elements at once as the beam flutters between the elements. The weighting circuit $30^1$ splits the current from each of the multiple photodetector elements in dependence upon the position of the photodetector element in array row. As a consequence, the resulting signal levels on lines 23 and 24 are the sums of the various illuminated photodetector elements, and these signal levels accurately reflect the average position of the middle of the beam.

The photodetector elements CR1–CR12 in array $15^1$ are evenly spaced along a generally vertically oriented row. It is desired that the elements CR1–CR12 be spaced apart by distances that are small as compared to the dimension of the beam of reference light that is to be detected. As a consequence, as the light moves vertically with respect to the row of elements it will move onto one photodetector element as it moves off of the adjacent photodetector element. If the spaces between adjacent elements were too large, the levels of the signals on lines 23 and 24 might fluctuate undesirably, even though their relative amplitudes continued to reflect accurately the position of the light.

The output circuits 22 are associated with, and responsive to, reference signals on lines 23, 24, 25, and 26 from connected weighting circuits The output circuits 22 assess the relative levels of the reference signals from the weighting circuits $30^1$, $30^2$, $30^3$, and $30^4$ such that the position of the reference light may be determined with respect to the detector device. Each output circuit preferably includes a separate filter circuit, current-to-voltage amplifier circuit, and peak detection and hold circuit for processing the reference signals on lines 23, 24, 25, and 26. Preferably, the reference signals are converted to digital form. The relative levels of the processed reference signals are assessed by output circuits 22, including microprocessor 50, to determine the position of the reference plane of light with respect to the row of PIN diodes in arrays $15^1$, $15^2$, $15^3$, and $15^4$.

This can be accomplished in a variety of ways. For instance, if the relative levels of the first and second reference signals on lines 23 and 24 change linearly as the light moves up and down the row of photodetectors in array $15^1$, the reference light will be spaced along the row by a fraction of the row length that is equal to the fraction of one of the reference signals divided by the sum of the reference signals one lines 23 and 24. By this technique, it will be appreciated that the absolute intensity of the light striking the photodetector elements is immaterial. Rather, it is the relative levels of the two reference signals from the circuit $30^1$ that define the position of the reference light. Alternatively, the ratio of the first and second reference signals may be taken and used as the address for a table look up algorithm. It will be appreciated that the position of the reference light may be categorized in broad or narrow bands, or specified with any level of precision desired.

Since the device of FIGS. 1 and 2 includes four photodetector arrays, the position of the light with respect to the extended row defined by the arrays may be determined as follows. Array $15^1$ connects to weighting circuit $30^1$ and lines 23 and 24 on which reference signals A1 and A2 are provided, respectively. Array $15^2$ connects to weighting circuit $30^2$ and lines 24 and 25 on which reference signals A2 and A3 are provided, respectively. Array $15^3$ connects to weighting circuit $30^3$ and lines 25 and 26 on which reference signals A3 and A4 are provided, respectively. Finally, array $15^4$ connects to weighting circuit $30^4$ and lines 26 and line 27 on which reference signals A4 and A5 are provided.

The position of the reference light can be determined by the formula $(A1-A2)/(A1+A2)$ if it is on the first array $15^1$, $(A2-A3)/(A2+A3)$ if it is on the second array $15^2$, $(A3-A4)/(A3+A4)$ if it is on the third array 15, and so on. It is, of course, possible for the reference light to illuminate photodetectors in two adjacent arrays simultaneously, falling across the boundary of two adjoining photodetector arrays. This results in signals being produced by both arrays. The formulae for the individual arrays can be combined into one formula which deals with simultaneous illumination of multiple arrays. For two concatenated arrays, the combined formula is $(2 \cdot A1-2 \cdot A3)/(A1+A2+A3)$. For three concatenated arrays, the combined formula is $(3 \cdot A1+A2-A3-3 \cdot A4)/(A1+A2+A3+A4)$. For four concatenated arrays, the combined formula is $(4 \cdot A1+2 \cdot A2-2 \cdot A4-4 \cdot A5)/(A1+A2+A3+A4+A5)$. The formula may be chosen for any desired number of arrays. The microprocessor 50 performs these simple calculations in a straightforward fashion.

Figure 3:
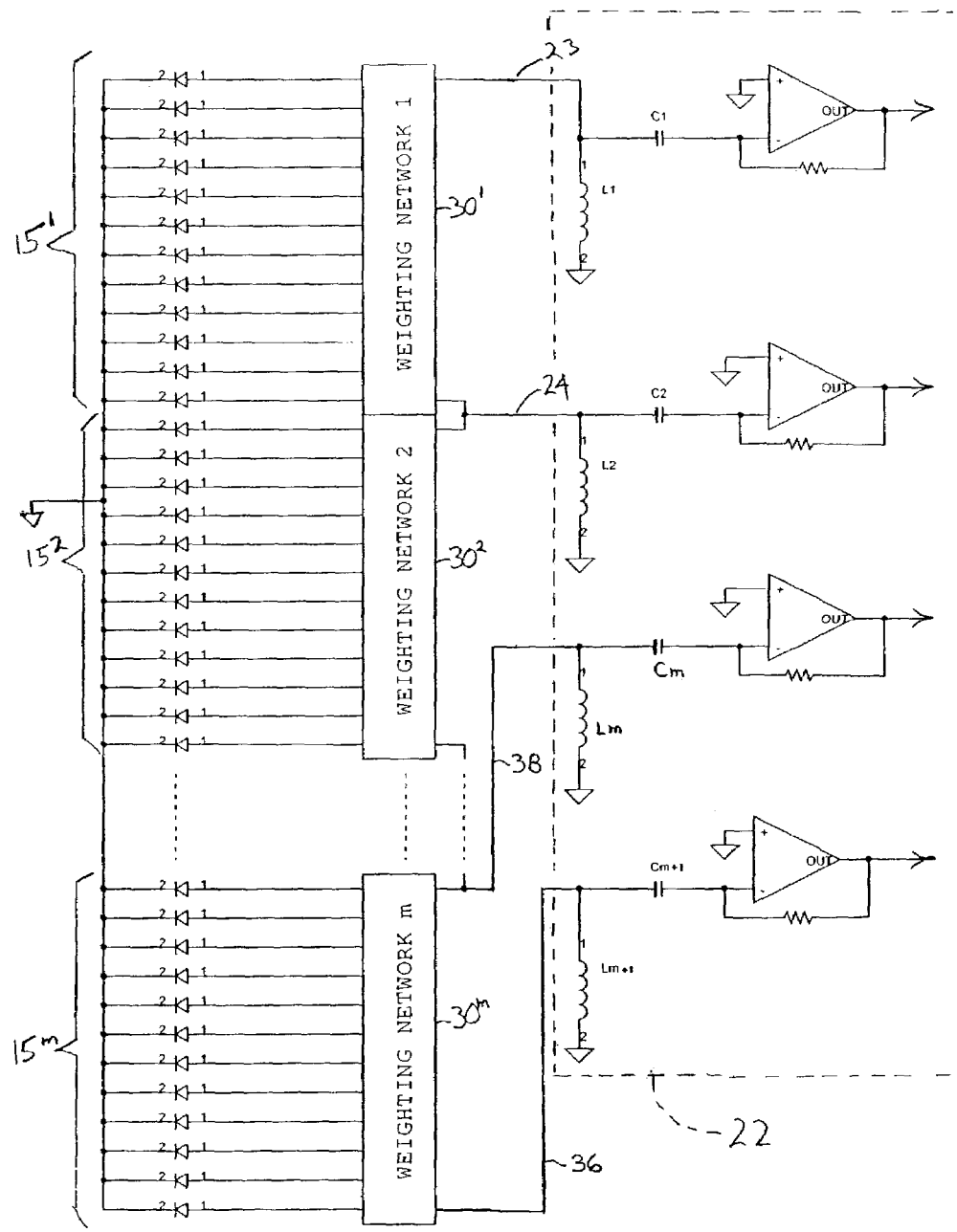
FIG. 3 is a schematic diagram of a portion of the circuitry which forms the device of the present invention, showing m arrays connected to m concatenated weighting circuits.

FIG. 3 is a schematic diagram, illustrating the generalization of the device of the present invention to include m weighting circuits $30^1$, $30^2$, . . . $30^m$, which respond to m corresponding photodetector arrays $15^1$, $15^2$, . . . $15^m$. As will be appreciated, most photodetectors, such as PIN diodes and phototransistors, are relatively small, and are therefore spaced on about 0.10 to 0.30 inch centers. Close spacing of the photodetectors permits detection of a relatively narrow beam of laser light, for example. Consequently the number of photodetectors required to build a receiver from about 6 inches up to 6 feet in length ranges from about 25 to over 250. This would be increased, of course, depending upon the number of rows of receivers that are used to receive light from different sides of the device. A practical device may typically include an extended row of photodetectors that is 18 inches high and includes seven or eight arrays and seven or eight associated weighting circuits. The present invention permits this to be accomplished by connecting photodetector arrays and weighting circuits in concatenated fashion. This produces a relatively small number of reference signals that nevertheless define the position of the detected reference light quite precisely. As will be noted, the connections of the PIN diodes of FIG. 3 is opposite to those of the PIN diodes of FIG. 2, illustrating that either connection arrangement may be utilized in conjunction with appropriate circuitry.

The present invention contemplates a method of operating the device described above for detecting the relative position of a generally horizontal reference plane of light. Initially a plurality of photodetector arrays are arranged in a generally vertical row. Each array includes a plurality of photodetector elements also arranged in a generally vertical array row. As a result, the photodetector elements are arranged in a generally vertically oriented, extended row. Each of the photodetector elements provides an electrical output when illuminated with the reference plane of light. A portion of the electrical output of each photodetector element in each array is provided as a first reference signal related to the spacing of the photodetector element from a first end of the array row. A portion of the electrical output of each photodetector element in the array is provided as a second reference signal related to the spacing of the photodetector element from the second end of the array row. The position of the reference plane of light with respect to the extended row is determined based on the levels of the first and second reference signals from each of the arrays.

Portions of the electrical outputs may be separated using a tapped transformer, with each of the plurality of photodetector elements being connected to the transformer. A plurality of tapped transformers are provided. Each of the plurality of transformers is connected to an associated photodetector array. The transformers are connected in series in the same order as the arrangement of the arrays with which they are associated in said extended row. The portions of the electrical outputs are separated using a tapped transformer, with each of the plurality of photodetector elements being connected to the transformer. For each photodetector array, the photodetector elements are connected to the transformer using one or more resistors.

A number of changes and variations may be made to the device of the present invention. For example, the output circuits 22 may be reduced in number by supplying more than one weighting circuit output to the same amplifier circuit. The lower of the two outputs 36 from weighting circuit $30^m$ may be supplied in parallel with the output on line 23 from weighting circuit $30^1$. In such an arrangement, the microprocessor will have no difficulty in distinguishing between the situation in which array $15^1$ is illuminated and the situation in which array $15^m$ is illuminated, since in the former a signal will be received on line 23, and in the latter a signal will be received on line 38.

Other variations in the construction and implementation of the device of the present invention may be made, as well. The number of arrays concatenated together can be more or fewer than the implementation shown, to make a longer or shorter receiver. The number of photodetectors in each array may be more or fewer than the implementation shown. This may be accomplished by using different components to make up the weighting networks, such as transformers with a different number of taps, or using a different arrangement of resistors between the transformer taps.

If desired, the weighting function may be implement by means other than a transformer. For example, a resistor network may be used. Such an arrangement may require applying a reverse bias voltage to the photodetectors in the arrays, depending on their parameters and the intensity of the incident light and the ambient light.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A device for detecting the relative position of reference light, comprising:
    a plurality of photodetector arrays arranged in a generally vertical row, each array including a plurality of photodetector elements arranged in a generally vertical array row, such that the photodetector elements in said arrays are arranged in a generally vertically oriented, extended row, each of said photodetector elements providing an electrical output when illuminated with said reference light,
    a plurality of weighting circuits, each weighting circuit associated with a respective one of said plurality of photodetector arrays, each weighting circuit providing a portion of the electrical output of each photodetector element in the array as a first reference signal related to the spacing of the photodetector element from a first end of said array row, and providing a portion of the electrical output of each photodetector element as a second reference signal related to the spacing of the photodetector element from the second end of said array row, the weighting circuit associated with each array row being connected to the weighting circuits associated with adjacent array rows, and
    a plurality of output circuits, each output circuit associated with and responsive to the reference signals from connected weighting circuits, for determining the relative levels of said reference signals from said weighting circuits such that the position of said reference light with respect to said detector device may be determined.

2. The device for detecting the relative position of reference light according to claim 1, in which said photodetector elements comprise PIN diodes.

3. The device for detecting the relative position of reference light according to claim 1, in which each of said weighting circuit comprises a tapped transformer circuit with each of said plurality of photodetector elements in an array being connected to said tapped transformer circuit of said associated weighting circuit.

4. The device for detecting the relative position of reference light according to claim 3, in which said weighting circuit further comprises one or more resistors connecting said photodetector elements to said transformer.

5. The device for detecting the relative position of reference light according to claim 1, in which the photodetector elements are evenly spaced along said positioned adjacent each other on said device are evenly spaced along said generally vertically oriented, extended row.

6. The device for detecting the relative position of reference light according to claim 1, further comprising a display, responsive to said output circuit, for providing an indication of said position of said reference light with respect to said detector device.

7. A method for detecting the relative position of reference light, comprising:
    positioning a plurality of photodetector arrays arranged in a generally vertical row, each array including a plurality of photodetector elements arranged in a generally vertical array row, such that the photodetector elements in said arrays are arranged in a generally vertically oriented, extended row, each of said photodetector elements providing an electrical output when illuminated with said reference light,
    for each photodetector array, providing a portion of the electrical output of each photodetector element in the array as a first reference signal related to the spacing of the photodetector element from a first end of the array row, and providing a portion of the electrical output of each photodetector element in the array as a second reference signal related to the spacing of the photodetector element from the second end of said array row, and
    determining the position of said reference light with respect to said extended row based on the levels of said first and second reference signals from each of the arrays.

8. The method for detecting the relative position of reference light, according to claim 7, further comprising the step of displaying an indication of said position of said reference light with respect to said row.

9. The method for detecting the relative position of reference light, according to claim 7, in which the step of positioning a plurality of photodetector arrays includes the step of positioning a plurality of PIN diodes in a plurality of arrays.

10. The method for detecting the relative position of reference light, according to claim 7, in which the step of, for each photodetector array, providing a portion of the electrical output of each photodetector element in the array as a first reference signal related to the spacing of the photodetector element from a first end of the array row, and providing a portion of the electrical output of each photodetector element in the array as a second reference signal related to the spacing of the photodetector element from the second end of said array row includes the step of separating said portions of said electrical outputs using a tapped transformer with each of said plurality of photodetector elements being connected to said transformer.

11. The method for detecting the relative position of reference light, according to claim 10, in which a plurality of tapped transformers are provided, with each of said plurality of transformers being connected to an associated photodetector array, and with the transformers connected in series in the same order as the arrangement of the arrays with which they are associated in said extended row.

12. The method for detecting the relative position of reference light, according to claim 11, in which the step of separating said portions of said electrical outputs using a tapped transformer with each of said plurality of photodetector elements being connected to said transformer further includes the step of, for each photodetector array, connecting said photodetector elements to said transformer using one or more resistors, and electrically connecting said tapped transformer.

13. The method for detecting the relative position of reference light, according to claim 7, in which the step of positioning a plurality of photodetector arrays in a generally vertically oriented row comprises the step of evenly spacing said plurality of photodetector arrays along said generally vertically oriented row, and evenly spacing said plurality of photodetector elements within each array.

14. The method for detecting the relative position of reference light, according to claim 11, further comprising the step of receiving said first reference signals and said second reference signals from the ends of the plurality of tapped transformers.

* * * * *